United States Patent [19]

Grimes

[11] Patent Number: 5,331,577
[45] Date of Patent: Jul. 19, 1994

[54] AIRCRAFT WING POSITION INDICATOR

[76] Inventor: Nickolas H. Grimes, 2344 Port Aberdeen Pl., Newport Beach, Calif. 92660

[21] Appl. No.: 936,277

[22] Filed: Aug. 28, 1992

[51] Int. Cl.⁵ .............................. G01B 11/26
[52] U.S. Cl. .................................... 364/559
[58] Field of Search ............ 250/561, 206.2, 553, 250/561; 364/559; 244/117 R

[56] References Cited

U.S. PATENT DOCUMENTS

| | | | |
|---|---|---|---|
| 4,470,122 | 9/1984 | Sarr | 364/559 |
| 4,583,000 | 4/1986 | Pryor | 250/561 |
| 4,794,245 | 12/1988 | Auer | 250/206.2 |
| 4,827,436 | 5/1989 | Sabersky et al. | 364/559 |
| 4,914,284 | 4/1990 | Halldorsson et al. | 250/206.2 |
| 5,025,297 | 6/1991 | Murakami et al. | 250/206.2 |

Primary Examiner—Jack B. Harvey
Assistant Examiner—Thomas Peeso
Attorney, Agent, or Firm—G. Donald Weber, Jr.

[57] ABSTRACT

An apparatus for use with aircraft to detect the position of the aircraft relative to the fuselage in order to achieve improved safety and flight conditions. The apparatus includes a signaling device such as a laser and a sensor of any suitable configuration. The device and the sensor are mounted on the wing or fuselage, respectively.

9 Claims, 1 Drawing Sheet

5,331,577

AIRCRAFT WING POSITION INDICATOR

BACKGROUND

1. Field of the Invention

This invention is directed to aircraft sensing devices, in general, and to devices for sensing the position of the wing of an aircraft relative to the fuselage thereof, in particular.

2. Prior Art

Airplanes are well-accepted vehicles in current science and technology. Current aircraft utilize a fuselage and at least one wing. The fuselage is usually an elongated, generally cylindrical body and the wings extend outwardly therefrom. The wings can be located at virtually any position along the axis of the fuselage. In addition, tail wings are, generally, provided adjacent the rearward end of the fuselage to provide stability.

The wings are, of course, a very important aspect of an airplane in providing the surface to which the lifting forces are applied in flight. However, the wings are exposed to many hidden hazards, some of which can be internal wing damage or metal fatigue. These problems, among others, can be discovered and even measured by observing and measuring the position of the wing relative to the fuselage or, in other words, measuring the degree of droop or sag that the wing displays relative to the fuselage. This measurement may be referred to as the "attitude" of the wing relative to the fuselage. Of course, the aircraft must be stationary on level ground and the ambient air temperature noted.

Likewise, in inclement weather, ice may form on the interior or exterior surfaces of the wing and incorporate excessive wing weight. This burdening effect on the wing manifests itself as a lower wing position.

On the other hand, when the aircraft is aloft, the wing position changes in the opposite direction, i.e. the wings bend upwards. By measuring this upward bend (or dihedral) relative to the fuselage and noting the air temperature, the weight effect of the fuselage and its payload can be determined irrespective of any weight calculations or computations. Of course, the airplane must be flying straight and level and in non-turbulent conditions.

To date, there is no known mechanism for measuring the position of the wing reactive to the fuselage of an airplane in flight.

PRIOR ART STATEMENT

The below-listed patents have been discovered during a patentability search.

U.S. Pat. No. 4,899,284; WING LIFT/DRAG OPTIMIZING SYSTEM; G.E. Lewis et al. This patent is directed to a wing camber command system for calculating the optimum camber of a wing during aircraft operations.

U.S. Pat. No. 4,729,102; DATA ACQUISITION AND RECORDING SYSTEM; L.D. Miller, Jr. et al. This patent is directed to a combined flight data recorder data acquisition circuit and an airborne integrated data circuit that can be used to supplement existing aircraft systems or operate as a stand-alone system in such aircraft.

U.S. Pat. No. 4,723,214; AUTOMATIC CAMBER CONTROL; D.R. Frei. This patent is directed to a control system for a multi-plane aircraft for controlling the camber control system thereof.

U.S. Pat. No. 3,748,900; RATE OF CHANGE OF ENERGY INDICATOR; O.H. Lindquist. This patent is directed to an apparatus for providing a pilot of an airplane with an indication of the rate of change of specific energy of the airplane.

U.S. Pat. No. 4,044,975; AIRCRAFT SPEED COMMAND SYSTEM; F.C. Blechen. This patent is directed to a system for displaying to the pilot of an aircraft the information to enable the pilot to fly to a desired airspeed and angle of attach, especially in takeoff.

SUMMARY OF THE INSTANT INVENTION

This invention is directed to a detector system for detecting and determining the position of the wings of an aircraft relative to the fuselage thereof. In a particular embodiment, a laser is mounted to the wings or anything attached to the wings of the aircraft, for example, adjacent the outer ends thereof. A plurality of sensors are disposed at or on the surface of the fuselage. The laser projects a light beam onto the sensors which are adapted to receive a signal from the laser. The sensors are arranged to provide an indication of the position of the wing relative to the fuselage. That is, the sensors are connected to appropriate signal circuits which can calibrate and, thus, monitor the position of the wing relative to the fuselage as a function of the sensor which is activated by the signal from the laser.

The laser/sensor system can be used on the lifting wings and/or on the horizontal stabilizer wings, generally located at the aft end of the aircraft.

Of course, the laser and sensor positions can be reversed in terms of the mounting locations thereof.

DESCRIPTION OF A PREFERRED EMBODIMENT

Figure 1:
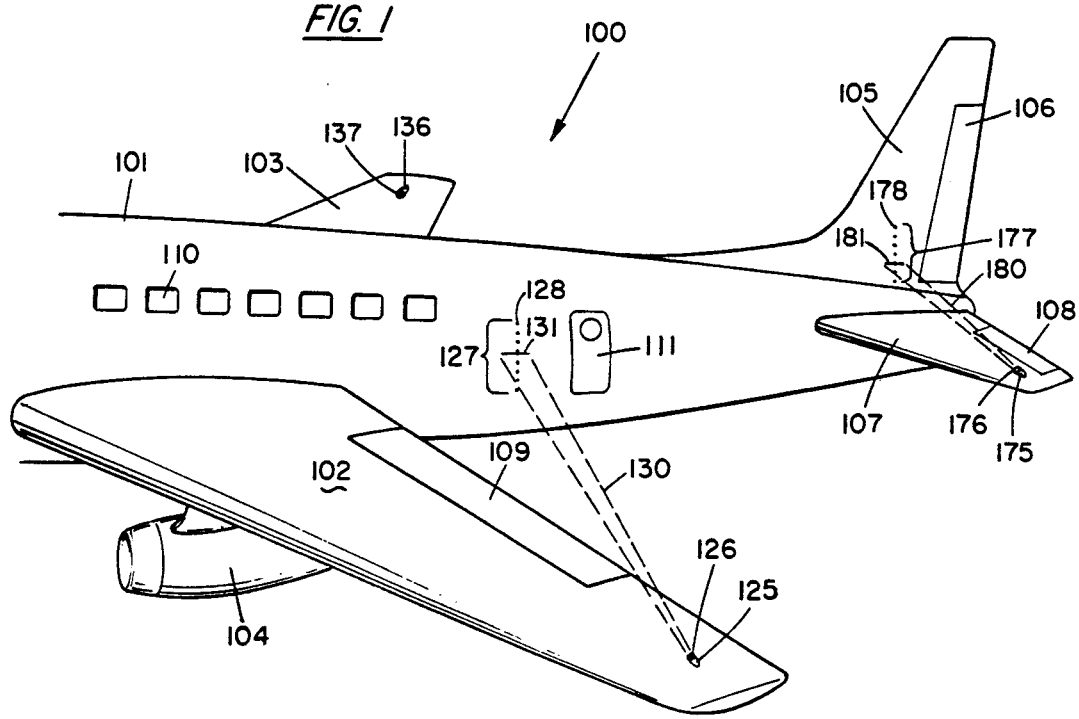
FIG. 1 is a representation of an aircraft including the instant invention.

Referring now to FIG. 1, there is shown a representative illustration of an aircraft 100. The type of aircraft is not critical and can include multiple engine aircraft (or gliders). The engines can be mounted above or below the wing or the like. The engines can be jet or piston type. The arrangement and/or type of engine does not form a portion of the invention, per se.

In the embodiment shown in FIG. 1, the aircraft 100 includes a fuselage 101, which is of conventional configuration. That is, the fuselage has an elongated, generally cylindrical, configuration which may be tapered at one or both ends.

A first lifting wing 102 extends outwardly from one side of fuselage 101 while a counterpart lifting wing 103 extends outwardly from the other side of the fuselage. A typical aileron 109 is shown in wing 102. In this embodiment, an engine 104 is mounted to wing 102. A counterpart aileron and engine (not shown) is mounted to or included in wing 103 on the other side of the aircraft.

At the rear or tail of the aircraft is the upright tail portion 105 of the aircraft which includes a movable rudder 106. Likewise, adjacent to the rear portion of the aircraft is a horizontal stabilizer or tail wing 107 which includes the elevator 108. A counterpart wing (not shown) is disposed along the opposite side of the fuselage.

In some cases, multiple tail wings and/or multiple stabilizers can be included in the aircraft. These configurations can be included in this description, as well.

A plurality of windows 110 and a representative door 111 are shown in the fuselage.

This design and construction of the aircraft is considered conventional. The design of existing aircraft need not be altered in any fashion. Moreover, the components of the aircraft (as shown in the drawings) are intended to be representational only and are not limitative of the invention.

As shown in FIG. 1, a suitable laser 125 (or other signal-producing mechanism 125) is mounted adjacent to the outer end of wing 102. In a preferred embodiment, the mechanism 125 comprises a laser, a light source or the like. A similar mechanism 136 is mounted on or adjacent to the outer end of wing 103 on the other side of the aircraft. A detection apparatus 127 is mounted on or installed in the side of fuselage 101. (A similar detection apparatus (not shown) is provided on the opposite side of the fuselage.)

In this instance, the detection apparatus 127 includes a plurality of independent detection devices 128. Of course, it should be understood that the detection apparatus 127 can include a single detection device constructed in such a way as to provide a continuum of independent, discrete, or, in some fashion, detectable positions therealong.

In this embodiment, the detection apparatus 127 (including the plurality of detector devices or sensors 128) is shown arranged in a vertical line or array on the side of the fuselage 101. The array in FIG. 1 is essentially linear. It may be determined that the array will have some other preferred configuration which is arranged to complement the contour of the fuselage 101. Also, in a matrix (rows and columns) array of detector devices or sensors, wing deflection or twisting can be detected and/or monitored.

In the embodiment shown in FIG. 1, the laser mechanism 125 projects a beam 130 (shown in dashed outline) against the side of the fuselage. The beam 130 is arranged to produce a light pattern 131 which is relatively thin vertically and relatively wide horizontally. This beam arrangement can be achieved with any appropriate optical apparatus 126 mounted at or adjacent to the projection site of the light 125 or other signal-emitting apparatus. The optical apparatus 126 can be a lens device or the like. A similar optical apparatus 137 is mounted adjacent the signal source 136.

As shown in FIG. 1, the spot 131 interacts with a single sensor 128. It is, of course, contemplated that the spot 131 may be designed to interact with multiple sensors 128 in order to provide additional "fail-safe" indications as described hereinafter. Thus, a defect in a single detector would not cause an anomalous condition.

A similar arrangement is shown at the aft or tail portion of the aircraft in FIG. 1. Thus, a laser 175 is mounted on tail wing 107. A detector 177 is mounted in the fuselage or in the upright tail portion of the aircraft as shown. The laser 175 provides a beam 180 and a projected spot 181 onto a detector 177, which comprises a plurality of sensors 178. The operation of the detection apparatus at the aft portion of the aircraft is substantially identical to that of the detection scheme of the mid or forward portion of the aircraft.

As suggested above, similar laser and detector schemes and mechanisms can be provided on the opposite side of the aft portion of the aircraft, as well.

Figure 2:
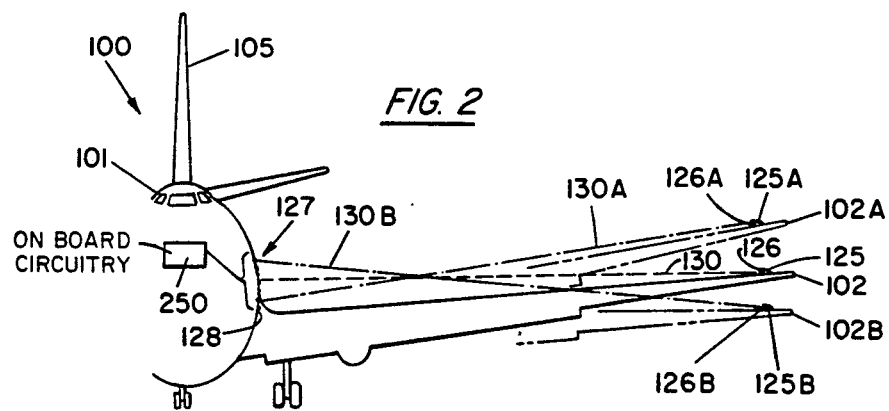
FIG. 2 is a schematic representation of a cross-sectional view of an aircraft showing the interaction of the laser/sensor components of the invention.

Referring now to FIG. 2, there is shown a representative cross-sectional view of the aircraft shown in FIG. 1. In the representation shown in FIG. 2, the engines have been omitted for convenience. In addition, the sensing apparatus on only one side of the aircraft is shown.

In FIG. 2, components which are similar to those shown in FIG. 1 bear similar reference numerals. Thus, it is seen that the wing 102 extends outwardly from the side of the fuselage 101. The specific mounting devices and techniques are omitted for clarity.

The laser 125 and optical apparatus 126 are shown attached to the upper surface of wing 102 at the outer end thereof. The beam 130 projected by laser 125 (via optical apparatus 126) impinges upon the side of fuselage 101 and interacts with one or more of the sensors 128 of the detector 127 in the same manner described and shown above.

As indicated in the discussion above, the wing 102 of the aircraft 100 is subject to flexure and flexibility. As the wing 102 moves upwardly in the process of lifting the aircraft off the runway, as indicated by wing position 102A, the laser in laser position 125A produces beam 130A via optical apparatus 126A. The beam 130A impinges upon the sensor apparatus 127 in the fashion noted. However, it is seen that because of the altered angle of the wing relative to the fuselage 101, the beam 130A strikes at a different portion of the sensor apparatus 127 than when the wing is in the "normal" on ground position.

In similar fashion, when wing 102 moves downwardly, as indicated by wing 102B, the laser 125B produces the beam 130B (via optical apparatus 126B) which impinges upon a different portion of sensor apparatus 127.

Also shown in FIG. 2 is a block 250, which represents the on-board circuitry of the aircraft. The circuitry 250 is connected to, inter alia, the sensor apparatus 127 in any suitable or conventional fashion. It should be noted that circuit 250 is also connected and sends information to (if so equipped) the digital flight data recorder, the life history recorder and the maintenance recorder. This will help monitor which pilot or what type of aircraft has a propensity for hard landings. As noted, the sensor apparatus 127 may include a plurality of individual detector sensors 128. The individual sensors 128 and/or sensor apparatus 127 can be connected to the on-board circuit 250. The circuit connection herein involved is considered to be conventional. Moreover, the on-board circuitry 250 is operated to detect, inter alia, the signal or signals generated by the detector sensors 128 in any appropriate fashion. Thus, the sensors 128 may be continuously monitored; they may be periodically scanned or the like. In addition, the on-board circuitry may include alarm circuits for indicating the impingement of a beam 130, 130A or 130B on a prescribed range of the sensor apparatus 127. That is, an alarm condition may exist and the crew of the aircraft can be alerted to this condition. Moreover, the on-board circuitry 250 can indicate whether the wing 102 is in the up (wing 102A) or down (wing 102B) position. More particularly, the system of this invention will indicate to what degree the wing is up while the airplane is aloft or to what degree the wing is down while the airplane is on the ground.

While not specifically shown and described, the same operation can take place with wing 103 on the other side of the aircraft and/or with regard to the tail and stabilizer portion of the aircraft.

It is also understood that the particular embodiment shown and described herein utilizes a laser 125. The laser can be replaced by any type of signal-generating mechanism. For example, in some instances, an electromagnetic wave, a microwave, a radio beam or any other suitable signal projection device can be utilized.

Likewise, the sensing mechanism can be a light-receiving or light-sensitive device; an electromagnetic beam sensitive device; or the like. Conversely, the devices can be operative to receive and/or interrupt signals in order to produce an activating operation.

In like fashion, the positioning of the detectors and the signal generators can be reversed. For example, the signaling device may be placed at the fuselage 101 of the aircraft and the detector mounted on the wing 102. This operation would probably be a little more difficult to implement and to calibrate. However, this method is contemplated by the instant invention.

In accordance with the invention described herein, many aspects of flight safety can be established in or for aircraft. That is, the apparatus described above is used to determine the position of the wing (or wings) relative to the fuselage of the aircraft. The onboard circuitry 250 can utilize the signals generated by the detecting scheme to establish a number of criteria regarding the aircraft.

For example, in airborne instances, the flexure of the wing above or below a predetermined "normal" condition can be used to determine the weight of the aircraft in flight. That is, the heavier the fuselage and its payload, the more the wing or wings will lift in relation thereto. This can be detected by causing the light sensing apparatus 127 to detect the light on the wing as being higher than normal. (Of course, the calibration can be altered so that the wing could be indicated to be lower than normal in some instances, such as when an airplane makes a hard landing.) Thus, by detecting the position of the wing, the weight of the fuselage can be, effectively, calibrated. This calibration could indicate, inter alia, the amount of fuel remaining, the fuel consumption to the present time, or any other factor which can be detected or projected based upon computer programming, calibration or the like in the onboard circuitry 250.

In an instance of landed detection, the apparatus can be used for detecting ice on the wings. That is, if the wings sag or droop (in ice or icy weather conditions), it may be determined that the wing is subject to icing, either internally or externally. This invention is especially useful in the case of internal icing, which is not readily visible to the ground crew. Consequently, as the wing position varies relative to the fuselage from a "normal" position on the ground, the condition of the wings can be ascertained. (Of course, it will be necessary to take into consideration the temperature of the wing inasmuch as a colder wing apparatus may be less flexible. This characteristic can be included in the onboard circuitry 250.)

Another landed feature of this invention is to determine if the wing sags or droops beyond a specified position without benefit of icing conditions. This sag or droop may be an indication of metal fatigue in the wing. In this instance, it may even be possible to detect that one wing of an aircraft droops or sags more than the counterpart wing on the other side of the aircraft. This could indicate some structural difficulties which could result in a dangerous aircraft.

As noted, the basic premise of this invention is to determine the wing position with regard to the fuselage. This can be used inflight or landed to detect different aspects of wing position and/or condition.

As noted, the sensors and/or sensor apparatus can take any number of suitable or desirable forms and configurations. Moreover, the energy source or light source (laser) can be placed anywhere on the wing or horizontal stabilizer. The source can be mounted on or adjacent to the wing or stabilizer. For example, the source can be mounted on the engine pods, the engine mount, the wings per se, or the like. It is submitted that the wing is probably the most appropriate place for mounting the source in order to avoid interference with the engine or, conversely, interference caused by the engines.

Thus, there is shown and described a unique design and concept of an aircraft wing position indicator. The particular configuration shown and described herein relates to devices for sensing the position of the wing of an aircraft relative to the fuselage thereof. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. An apparatus to monitor the position of the wings of an aircraft relative to the fuselage thereof,
   signal producing means mounted on said aircraft, and
   signal sensing means mounted on said aircraft to receive signals from said signal producing means,
   one of said signal producing means and said signal sensing means is mounted on said wings,
   the other one of said signal sensing means and said signal producing means is mounted on said fuselage,
   said signals are representative of the position of the wings of said aircraft relative to the fuselage thereof.

2. The apparatus recited in claim 1 wherein,
   said signal producing means is a laser.

3. The apparatus recited in claim 1 wherein,
   said signal sensing means comprises a plurality of sensor devices.

4. The apparatus recited in claim 3 wherein,
   said plurality of sensor devices are arranged in an array.

5. The apparatus recited in claim 1 wherein,
   said signal producing means and said signal sensing means are activated when said aircraft is in flight.

6. The apparatus recited in claim 5 including,
   control circuitry connected to monitor said signal sensing means and the signals supplied thereto by said signal producing means thereby to determine the weight effect and payload of the aircraft.

7. The apparatus recited in claim 1 including,
   at least one engine mounted to said wings.

8. The apparatus recited in claim 1 wherein,
   said signal sensing means is mounted in said fuselage as a matrix of detector devices arranged in a plurality of rows and at least one column.

9. The apparatus recited in claim 1 including,
   optical apparatus adapted to operate on the signal produced by said signal producing means in order to produce a preferred pattern thereof.

* * * * *